(12) United States Patent
Hötzel et al.

(10) Patent No.: US 12,291,083 B2
(45) Date of Patent: May 6, 2025

(54) THERMAL SYSTEM OF A MOTOR VEHICLE AND METHOD OF OPERATING THE THERMAL SYSTEM

(71) Applicant: Hanon Systems, Daejeon (KR)

(72) Inventors: Martin Hötzel, Ratingen (DE); Martin Möhlenkamp, Brühl (DE); Navid Durrani, Kerpen (DE)

(73) Assignee: HANON SYSTEMS, Daejeon (KR)

( * ) Notice: Subject to any disclaimer, the term of this patent is extended or adjusted under 35 U.S.C. 154(b) by 220 days.

(21) Appl. No.: 18/248,039

(22) PCT Filed: Nov. 30, 2021

(86) PCT No.: PCT/KR2021/017883
§ 371 (c)(1),
(2) Date: Apr. 5, 2023

(87) PCT Pub. No.: WO2022/124680
PCT Pub. Date: Jun. 16, 2022

(65) Prior Publication Data
US 2023/0373272 A1    Nov. 23, 2023

(30) Foreign Application Priority Data
Dec. 11, 2020    (DE) ..................... 10 2020 133 101.0

(51) Int. Cl.
*B60H 1/00* (2006.01)
*B60H 1/32* (2006.01)

(52) U.S. Cl.
CPC ..... *B60H 1/32284* (2019.05); *B60H 1/00485* (2013.01); *B60H 1/00885* (2013.01);
(Continued)

(58) Field of Classification Search
CPC ............ B60H 1/32284; B60H 1/00485; B60H 1/00885; B60H 1/00921;
(Continued)

(56) References Cited

U.S. PATENT DOCUMENTS 9,944,152 B2 *  4/2018  Kim ................... B60H 1/00428
11,021,037 B2 *  6/2021  Hwang ................. B60H 1/323
(Continued)

FOREIGN PATENT DOCUMENTS

CN    110303849 B    6/2021
DE    102017114136 A1    1/2018
(Continued)

*Primary Examiner* — Davis D Hwu
(74) *Attorney, Agent, or Firm* — Shumaker, Loop & Kendrick, LLP; James D. Miller

(57) ABSTRACT

A thermal system for conditioning the supply air for a passenger compartment and for cooling components of a drive train of a motor vehicle, in particular a thermal management system. The system has a refrigerant circuit with a compressor, a first refrigerant-to-air heat exchanger for transferring heat via ambient air, which is formed to be operable as a condenser/gas cooler and evaporator, a second refrigerant-to-air heat exchanger operated as a first evaporator with an upstream first flow control device as well as a heat exchanger operated as a second evaporator with an upstream second flow control device.

14 Claims, 4 Drawing Sheets

(52) U.S. Cl.
CPC .................... *B60H 1/00921* (2013.01); *B60H 2001/00307* (2013.01); *B60H 2001/00928* (2013.01); *B60H 2001/00949* (2013.01)

(58) Field of Classification Search
CPC ........... B60H 2001/00307; B60H 2001/00928; B60H 2001/00949
USPC ....................................................... 165/202
See application file for complete search history.

(56) References Cited

U.S. PATENT DOCUMENTS

| | | | |
|---|---|---|---|
| 11,760,156 B2 * | 9/2023 | Hwang | .............. B60H 1/00328 62/506 |
| 2017/0106725 A1 | 4/2017 | Kim et al. | |
| 2018/0022185 A1 | 1/2018 | Kawano | |

FOREIGN PATENT DOCUMENTS

| | | | |
|---|---|---|---|
| DE | 102018122675 A1 | | 4/2019 |
| EP | 0989003 A2 | | 3/2000 |
| KR | 101846908 B1 | | 4/2018 |
| KR | 20200092221 A | * | 8/2020 |

\* cited by examiner

THERMAL SYSTEM OF A MOTOR VEHICLE AND METHOD OF OPERATING THE THERMAL SYSTEM

CROSS REFERENCE TO RELATED PATENT APPLICATIONS

This is a U.S. national phase patent application of PCT/KR2021/017883 filed Nov. 30, 2021 which claims the benefit of and priority to German Patent Application No. 10 2020 133 101.0 filed on Dec. 11, 2020, the entire contents of each of which are incorporated herein by reference.

TECHNICAL FIELD

The invention relates to a thermal system for conditioning the supply air for a passenger compartment and for cooling components of a drive train, in particular a thermal management system, of a motor vehicle having a refrigerant circuit.

The invention also relates to a method of operating as well as a use of the thermal system.

BACKGROUND ART

In motor vehicles known from the prior art, the waste heat from the engine is used for heating the supply air for the passenger compartment. The waste heat is transported to the air conditioner by means of the coolant circulating in an engine coolant circuit and there, transferred to the air flowing into the passenger compartment via the thermal heat exchanger. Known installations with a coolant-to-air heat exchanger, which obtain the heating capacity from the coolant circuit of an efficient internal combustion engine of the vehicle drive system, do not generate enough waste heat to heat the air of the passenger compartment according to the requirements of thermal comfort and/or achieve the level required for comfortable heating of the passenger compartment and to cover the total heat demand of the passenger compartment, especially at low ambient temperatures. The same applies to installations in hybrid-drive motor vehicles, i.e., motor vehicles with both electromotive and engine-powered propulsion, referred to as HEV for short.

Moreover, there is a tendency towards full electrification of drives, such as with vehicles driven purely by electric motors with batteries or fuel cells, i.e., electric vehicles, referred to as EV for short. As such, there is no waste heat from the internal combustion engine as a possible heat source for heating the air.

In addition, the amount of energy storable in the battery of the vehicle is lower than the amount of energy storable in the form of liquid fuel within the fuel tank. Hence, the power required for the air conditioning of the passenger compartment of an electrically driven vehicle also has a significant influence on the range of the vehicle. The air conditioning system of an electrically driven motor vehicle has a very great influence on the efficiency of the operation of the motor vehicle and its energy consumption.

If the total heat demand of the passenger compartment cannot be covered by the heat from the engine coolant circuit, additional heating measures, such as electrical resistance heaters, briefly referred to as PTC thermistor for "Positive Temperature Coefficient thermistor" or fuel heaters, are required. While prior-art air conditioning systems with a downstream electric resistance heater can be manufactured at low costs and used in any kind of motor vehicles, they have a very high demand for electric energy, because if an evaporator of the refrigerant circuit overflows, the supply air for the passenger compartment must first be cooled and/or dehumidified and then heated by means of the electric resistance heater which transfers the heat directly to the supply air or a coolant circuit.

Apart from the high energy consumption, conventional systems with a refrigerant circuit exclusively formed for cooling the air in combination with an electrical resistance heater also have discharge temperatures of the supply air for the passenger compartment which are too low, especially in regions with low ambient air temperatures.

A more efficient way to heat the air for the passenger compartment is an air conditioning system having a refrigerant circuit with a heat pump function, also referred to as a heat pump, with air as the heat source, in which the refrigerant circuit serves both as a single heating and as an additional heating measure. While operation of a conventional refrigerant circuit to be operated as a heat pump is efficient, it takes up considerably more installation space than a refrigerant circuit formed only for cooling the air in combination with an electric resistance heater, also in positions within the motor vehicle where there is no installation space reserved for the air conditioning.

On the one hand, refrigerant circuits operable in the heat pump mode are very complex, also due to the large number of components, such as heat exchangers and the required associated valves and/or expansion members. On the other hand, the refrigerant circuits have so-called external heat exchangers for absorbing heat from the ambient air and for evaporating the refrigerant, in which, compared to operation in the refrigeration system mode, a reversal of the flow direction of the refrigerant is necessary for operation in the heat pump mode. However, the flow direction of the refrigerant can only be reversed when the compressor of the refrigerant is deactivated, which can lead to an undesired decrease or increase in the discharge temperature of the supply air for the passenger compartment.

It is inherent to all air conditioning systems of motor vehicles having a refrigerant circuit to be operated as a heat pump, that during operation in the refrigeration system mode, the heat required for evaporation of the refrigerant is absorbed from the supply air for the passenger compartment or a coolant circuit, for example, for controlling the temperature of electrical components of the drive train, such as the traction battery. In a heat exchanger operated as a condenser/gas cooler, the heat absorbed during evaporation is released to the environment at a higher temperature level. During operation of the refrigerant circuit in the heat pump mode, the heat required for evaporation of the refrigerant is absorbed from a waste heat source, such as the ambient air or the coolant circuit, for example, for controlling the temperature of electrical components of the drive train. In a heat exchanger disposed as a so-called interior or passenger compartment condenser/gas cooler, the heat is released at a high temperature level to the supply air of the passenger compartment.

In prior-art air-to-air heat pumps which are formed for the combined refrigeration system mode and heat pump mode, i.e., for a heating mode, as well as for a post-heating mode, also referred to as a reheat operation, and absorb the heat from the ambient air, the refrigerant is evaporated by the absorption of heat from the ambient air, which is transferred to the refrigerant either directly in a refrigerant-to-air heat exchanger or in a refrigerant-to-coolant heat exchanger and thus indirectly. Consequently, the ambient air serves as a heat source for evaporation of the refrigerant. The capacity and efficiency of the system depends in particular on how much and at which temperature level heat is available for evaporation of the refrigerant.

In addition to the heat exchanger for heat transfer between the refrigerant and the ambient air, the conventional air-to-air heat pumps have a heat exchanger for supplying heat from the air of the passenger compartment to be conditioned to the refrigerant, as well as a heat exchanger for transferring heat from the refrigerant to the air for the passenger compartment to be conditioned. As such, capacity is transferred between the refrigerant and the air.

In the so-called "reheat" or post-heating mode, the air to be supplied to the passenger compartment is cooled, thus dehumidified, and then slightly reheated. In this operating mode, the required post-heating capacity is lower than the required refrigerating capacity for cooling and dehumidifying the air.

As such, the heat exchanger for transferring heat between the refrigerant and the ambient air of the air-to-air heat pump, also referred to as an ambient heat exchanger, is disposed outside of the housing of the air conditioning system, more specifically outside of the air-conditioning device, on the front side of the motor vehicle and is particularly supplied with air from the headwind. During operation of the refrigerant circuit in the refrigeration system mode, the ambient heat exchanger is operated as a condenser/gas cooler for releasing heat from the refrigerant to the ambient air, and during operation of the refrigerant circuit in the heat pump mode, it is operated as an evaporator for absorbing heat from the ambient air by the refrigerant.

During operation of the refrigerant circuit in the heat pump mode and with ambient air as the heat source, at temperatures of the air in the range of 0° C. and below 0° C., there is a risk of icing of the heat transfer surface of the heat exchanger operated as an evaporator which limits the capacity of the heat exchanger. As a result of the absorption of heat from the air, the relative humidity of the cooled air increases. When falling below the dew-point temperature, the water vapor present in the air condenses out and deposits on the heat transfer surface as water. The water condensed out of the air on the heat transfer surface will turn into ice at surface temperatures in the range of 0° C. and below 0° C. The growing layer of ice sheet reduces the heat transfer surface on the air side as well as the heat transfer on the air side and thus the transferable capacity between the air and the evaporating refrigerant which leads to a decrease in the efficiency of the overall air conditioning system. Usually, the maximum temperature difference between the temperature of the air entering the ambient heat exchanger and the temperature of the refrigerant is limited, which in turn limits the maximum amount of heat absorbable from the ambient air.

Due to the necessary avoidance of icing of the heat transfer surface of the ambient heat exchanger, at air temperatures in the range of 0° C. and below 0° C., even with air conditioning systems formed as air-to-air heat pumps, it is not possible to sufficiently heat the passenger compartment if only the ambient air is used as a heat source, so that additional heating measures are required. It is known that the potential electric resistance heaters are not energy efficient.

To increase the energy consumption and the efficiency of the operation of the motor vehicle, conventional air conditioning systems with a heat pump function are employed which can utilize different heat sources. As such, being formed with additional components such as a high-voltage battery, an internal charger, a transformer, an inverter as well as the electric motor, electric vehicles or hybrid vehicles, in particular, usually have a higher refrigeration demand than motor vehicles with a pure internal combustion engine drive and/or an additional cooling demand. Also, to comply with the permitted temperature limits of the high-voltage battery, in particular, which are usually in the range of 0° C. to 35° C., in particular between 20° C. and 35° C., systems with a heat pump function are preferably employed which are used to implement active cooling concepts and heating concepts. For example, the additional components of the electric drive train are useable as heat sources.

As such, the refrigerant circuit of the air conditioning systems with a heat pump function known from the prior art is mostly formed with a refrigerant-to-coolant heat exchanger, also referred to as a chiller, on the pressure side, which thermally connects a coolant circuit for controlling the temperature of the components of the electric drive train to the refrigerant circuit. The coolant circulating in the coolant circuit can be utilized as a heat source for the refrigerant. With the so-called low-temperature coolant circuit, the waste heat absorbed by the coolant can also be transferred directly to the environment through a low-temperature heat exchanger, without operating the refrigerant circuit. Along with the complexity, the large number of components to be provided for such an air conditioning system also increases the system costs of the motor vehicle.

DE 10 2017 114 136 A1 describes a motor vehicle with a thermal system having a refrigerant circuit and a coolant circuit. The refrigerant circuit and the coolant circuit are thermally connected to each other via a heat exchanger. The refrigerant circuit is used to control the temperature of the supply air for a passenger compartment and to absorb heat from the coolant circuit, the latter being used in particular for cooling components of the electric drive train, such as a battery, of the motor vehicle.

DE 10 2018 122 675 A1 teaches a thermal system for conditioning the supply air for a passenger compartment and for cooling components of a drive train of a motor vehicle, having a refrigerant circuit with a heat pump function with various heat sources and heat sinks. The refrigerant circuit has a refrigerant-to-air heat exchanger operable, depending on the operating mode, as a condenser/gas cooler or an evaporator to transfer heat via ambient air, a refrigerant-to-air heat exchanger operated as an evaporator to absorb heat from supply air of the passenger compartment, as well as a heat exchanger operated as an evaporator to absorb heat from a coolant circuit, and a refrigerant-to-air heat exchanger operated as a condenser/gas cooler to heat the supply air for the passenger compartment.

The object of the invention is to provide a thermal system or air conditioning system with sufficient refrigerating capacity and sufficient heating capacity for the supply air of the passenger compartment, in particular for motor vehicles having a highly efficient engine-powered drive, an electric drive or a combined electric and engine-powered drive. The system should have a diverse potential of possible operating modes with a minimum number of components of the refrigerant circuit, such as heat exchangers and expansion members, compared to known systems. Hence, it is intended, for example, to maximize the potential range of, in particular, electrically powered motor vehicles with minimum monetary expenditure. As such, the system, in particular the refrigerant circuit with the heat pump functionality, should be very easy to control and be optimally and efficiently operable in all possible operating modes as well as under all possible external conditions and needs. The consumption of electrical energy during operation should be minimal.

In addition, the manufacturing, maintenance, and operating costs as well as the required installation space of the system should be minimal.

SUMMARY

The object is achieved by the subject-matter and the method having the features as shown and described herein.

The object is achieved by a thermal system according to the invention for conditioning the supply air for a passenger compartment and for cooling components of a drive train of a motor vehicle, in particular a thermal management system. As such, the components of the drive train of the motor vehicle can serve as a heat source depending on the demand and operating mode of the system.

The thermal system has a refrigerant circuit with a compressor, a first refrigerant-to-air heat exchanger operable as a condenser/gas cooler and an evaporator for transferring heat via ambient air, a second refrigerant-to-air heat exchanger operated as a first evaporator with a first flow control device upstream in the flow direction of the refrigerant as well as a heat exchanger operated as a second evaporator with a second flow control device upstream in the flow direction of the refrigerant.

Depending on the demand and operating mode of the system, in particular of the refrigerant circuit, the first refrigerant-to-air heat exchanger can either be operated as an evaporator or as a condenser/gas cooler. As such, the first refrigerant-to-air heat exchanger is advantageously passed through by the refrigerant unidirectionally or monodirectionally independently of the operating mode of the system.

If the liquefaction of the refrigerant occurs during subcritical operation, such as with the refrigerant R134a or in certain ambient conditions with carbon dioxide, for example, the heat exchangers are referred to as a condenser. Part of the heat transfer takes place at a constant temperature. During supercritical operation or supercritical heat release in the heat exchanger, the temperature of the refrigerant continues to decrease. In this case, the heat exchanger is also referred to as a gas cooler. Supercritical operation may occur under certain ambient conditions or modes of operation of the refrigerant circuit, for example, with the refrigerant carbon dioxide.

The refrigerant circuit also has a third refrigerant-to-air heat exchanger operated as a condenser/gas cooler for heating the supply air for the passenger compartment as well as a third flow control device which are disposed between the compressor and the first refrigerant-to-air heat exchanger. As such, the third flow control device is disposed downstream of the third refrigerant-to-air heat exchanger in the flow direction of the refrigerant.

According to the concept of the invention, the second refrigerant-to-air heat exchanger operated as the first evaporator with the upstream first flow control device is disposed within a first flow path, and the heat exchanger operated as the second evaporator with the upstream second flow control device is disposed within a second flow path of the refrigerant circuit. The flow paths, each extending from a branch-off point to a junction point of the refrigerant circuit, are disposed in parallel to each other and are formed to be suppliable with refrigerant individually or in parallel to each other, as required.

According to the invention, the first flow control device is formed as a branch-off point from which a main flow path and a bypass flow path of the first flow path each extend to the junction point. According to the concept, the second flow control device is also formed as a junction point, and a third flow path is formed to extend from a branch-off point to the second flow control device. As such, the branch-off point is disposed between the third refrigerant-to-air heat exchanger and the third flow control device upstream of the first refrigerant-to-air heat exchanger in the flow direction of the refrigerant.

Advantageously, the second refrigerant-to-air heat exchanger is disposed within the main flow path of the first flow path, while the bypass flow path of the first flow path is formed as a bypass to the second refrigerant-to-air heat exchanger.

According to a further improvement of the invention, the first flow control device is formed as a 3/2-way valve with three ports, A, B, C and a unilateral expansion function. As such, the first flow control device is configured as an expansion valve between a port C formed as an inlet and a port B formed as an outlet and is configured as a shut-off valve between port C formed as an inlet and port A formed as an outlet. The main flow path of the first flow path is connected to port B and the bypass flow path of the first flow path is connected to port A.

According to a preferred embodiment of the invention, the second flow control device is formed as a 3/2-way valve with three ports, A, B, C and a bilateral expansion function. As such, the second flow control device is configured as an expansion valve between ports A, B each formed as an inlet and a port C formed as an outlet. The heat exchanger operated as the second evaporator is disposed within the second flow path downstream of port C in the flow direction of the refrigerant.

A particular advantage of the invention is that the third flow control device upstream of the first refrigerant-to-air heat exchanger for transferring heat via ambient air is formed as an expansion valve.

According to a preferred embodiment of the invention, the heat exchanger operated as the second evaporator is formed as a refrigerant-to-coolant heat exchanger and is disposed within a coolant circuit. The coolant circuit has at least one heat exchanger for absorbing heat from the components of the drive train, in particular for cooling the components of the drive train.

In addition, the refrigerant circuit can be formed with an internal heat exchanger. The internal heat exchanger is understood to be a heat exchanger inside of a circuit, which is used to transfer heat between the refrigerant at high pressure and the refrigerant at low pressure. As such, for example, the liquid refrigerant is further cooled after the condensation or liquefaction, on the one hand, and the suction gas is superheated upstream of the compressor, on the other hand. On the low-pressure side, the internal heat exchanger is disposed within the first flow path downstream of the second refrigerant-to-air heat exchanger operated as an evaporator in the flow direction of the refrigerant.

According to a first alternative embodiment of the invention, on the high-pressure side, the internal heat exchanger is disposed between the first refrigerant-to-air heat exchanger for transferring heat via ambient air and the branch-off point of the first flow path and the second flow path.

According to a second alternative embodiment of the invention, on the high-pressure side, the internal heat exchanger is disposed within the first flow path upstream of the first flow control device in the flow direction of the refrigerant.

Furthermore, the refrigerant circuit can be formed with a refrigerant collector, also referred to as an accumulator, disposed on the low-pressure side.

According to a further improvement of the invention, the thermal system has an air-conditioning device with a fan for conveying the supply air for the passenger compartment through a housing. As such, the second refrigerant-to-air heat exchanger of the refrigerant circuit is preferably formed to cover the entire flow area of the housing.

Preferably, the housing has a first flow path and a second flow path which are disposed in parallel to each other and are formed to be suppliable with the supply air individually or in parallel to each other, as required. Advantageously, within the first flow path, the third refrigerant-to-air heat exchanger and an ancillary thermal heat exchanger are disposed in the flow direction of the supply air. As such, the second flow path is provided as a bypass for the first flow path.

The object is also achieved by a method according to the invention of operating a thermal system in accordance with the concept, in particular a thermal management system, a motor vehicle for operation in a refrigeration system mode, in a heat pump mode and in a post-heating mode for the supply air of a passenger compartment to be conditioned.

According to the concept of the invention, during operation of the system in a heat pump mode or a post-heating mode, for heating the supply air of the passenger compartment, the refrigerant is decompressed from a high-pressure level to a low-pressure level or to a medium-pressure level when passing through the third flow control device disposed between the third refrigerant-to-air heat exchanger and the first refrigerant-to-air heat exchanger, and evaporated with absorption of heat from the ambient air when passing through the first refrigerant-to-air heat exchanger operated as an evaporator. When passing through the third refrigerant-to-air heat exchanger, heat from the refrigerant is transferred to the supply air for the passenger compartment.

According to a further improvement of the invention, when passing through a flow passage of the second flow control device, the refrigerant is decompressed from the high-pressure level to the low-pressure level, and when passing through the second flow control device operated as an evaporator, it is evaporated with absorption of heat downstream of the heat exchanger in the flow direction of the refrigerant. As such, at the branch-off point of the third flow path formed between the third refrigerant-to-air heat exchanger and the third flow control device, the mass flow of the refrigerant is divided into a first partial mass flow through the first refrigerant-to-air heat exchanger as well as the first flow path and a second partial mass flow through the third flow path as well as the second flow path with the heat exchanger downstream of the second flow control device in the flow direction of the refrigerant.

According to a first alternative embodiment of the invention, during operation of the system in a post-heating mode, the refrigerant is directed through a fully opened first flow passage of the first flow control device and the main flow path of the first flow path with the second refrigerant-to-air heat exchanger to the compressor. As such, a second flow passage of the first flow control device and thus the bypass flow path of the first flow path are closed. When passing through the first flow control device, the refrigerant is decompressed from the medium-pressure level to the low-pressure level, and when passing through the second refrigerant-to-air heat exchanger operated as an evaporator, it is evaporated with absorption of heat.

According to a second alternative embodiment of the invention, during operation of the system in a heat pump mode, a mass flow of the refrigerant is directed though a fully opened second flow passage of the first flow control device and the bypass flow path of the first flow path past the second refrigerant-to-air heat exchanger to the compressor. As such, the first flow passage of the first flow control device and the main flow path of the first flow path are closed.

The advantageous embodiment of the invention allows for the use of the thermal system as an air conditioning system of a motor vehicle for conditioning the supply air for the passenger compartment as well as for conditioning components of the drive train and electronic components.

In summary, the thermal system according to the invention and the method of operating the system have various advantages:

- operable efficiently at different operating points, in particular during operation in the heat pump mode and/or heating mode or post-heating mode, the thermal management system leads to lower energy consumption and thus to a higher range of the motor vehicle, in particular with an electric drive,
- continuous transition between operation in the heat pump mode and/or heating mode and the refrigeration system mode without switching off the compressor,
- high degree of waste heat utilization, in particular with the components of the drive train as the heat source, with high potential heating capacity, while also the values of the pressure of the refrigerant upon evaporation and/or the suction pressure and thus the suction density are high, so that the mass flow of the refrigerant is also high,
- system of a simple design with minimum system complexity and number of components as well as minimum installation space at maximum capacity and efficiency of operation, amongst others without reversal of the flow direction of the refrigerant, specifically in the ambient heat exchanger operated as a condenser/gas cooler or evaporator, as well as the preferred configuration of the flow control device as 3/2-way valves with different expansion functions and with minimum required electric power for achieving comfort in the passenger compartment,
- hence, a simple oil management system by avoiding oil traps, and
- low costs of production and maintenance as well as during operation.

The thermal system or the air conditioning system, in particular the refrigerant circuit, is independent of the refrigerant used and thus also designed for R134a, R744, R1234yf or other refrigerants.

BRIEF DESCRIPTION OF DRAWINGS

Further details, features, and advantages of embodiments of the invention will become apparent from the following description of exemplary embodiments with reference to the accompanying drawings.

Each of the figures shows a thermal system of a motor vehicle with an air-conditioning device and a refrigerant circuit for conditioning the supply air for the passenger compartment as well as for cooling components of the drive train.

Moreover, in the drawings.

DESCRIPTION OF AN EMBODIMENT

Figure 1:
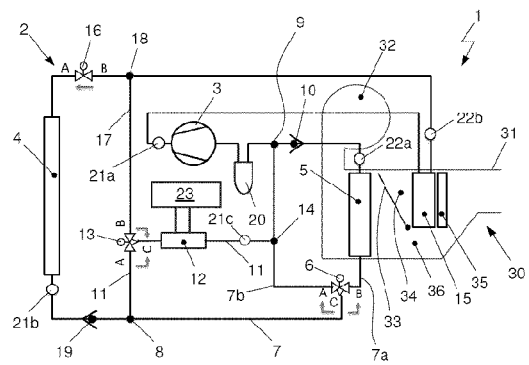
FIG. 1: with a first refrigerant-to-air heat exchanger operated as an evaporator or as a condenser/gas cooler, a second refrigerant-to-air heat exchanger operated as an evaporator as well as a refrigerant-to-coolant heat exchanger operated as an evaporator as well as flow control devices respectively associated with the heat exchangers and a third refrigerant-to-air heat exchanger operated as a condenser/gas cooler, during operation.

FIG. 1 illustrates a thermal system 1 with a refrigerant circuit 2 for conditioning the supply air for the passenger compartment and cooling components of the drive train of a motor vehicle.

Refrigerant circuit 2 is formed with a compressor 3, a first refrigerant-to-air heat exchanger 4 operated as an evaporator or as a condenser/gas cooler, a second refrigerant-to-air heat exchanger 5 operated as a first evaporator as well as a refrigerant-to-coolant heat exchanger 12 operated as a second evaporator as well as flow control devices 6, 13, 16 respectively associated with the heat exchangers 4, 5, 12 and a third refrigerant-to-air heat exchanger 15 operated as a condenser/gas cooler.

First evaporator 5 is disposed with the upstream first flow control device 6 within a first flow path 7 extending from a branch-off point 8 to a junction point 9. At flow control device 6 formed as a branch-off point, first flow path 7 is divided into a main flow path 7a and a bypass flow path 7b, each extending to junction point 9. Evaporator 5 is provided within main flow path 7a. Bypass flow path 7b of first flow path 7 is formed as a bypass for evaporator 5.

First evaporator 5 formed as a refrigerant-to-air heat exchanger is configured to condition, in particular to cool and/or dehumidify, the supply air for the passenger compartment. In addition, a check valve 10 is formed within main flow path 7a of first flow path 7, in particular between evaporator 5 and junction point 9, to prevent backflow of refrigerant into main flow path 7a of first flow path 7 depending on the operating mode of refrigerant circuit 2.

First flow control device 6 is formed as a 3/2-way vale with a unilateral expansion function. As such, a port C is passed through by the refrigerant as an inlet and two ports A and B are each passed through by the refrigerant as an outlet at any given time. When passing through first flow control device 6 from port C to port B, flow control device 6 can be operated as an expansion valve or with the full flow area and thus almost without any pressure loss. Between ports C and B, flow control device 6 is formed as an expansion valve with a shut-off function, while flow control device 6 between ports C and A is formed as a shut-off valve with the closed or fully opened functions with a passage of almost no pressure loss.

Second evaporator 12 is disposed with the upstream second flow control device 13 within a second flow path 11, extending from branch-off point 8 to junction point 14 formed within bypass flow path 7b of first flow path 7, and thus running substantially in parallel to first flow path 7. According to alternative embodiments, junction point 14 of second flow path 11 and junction point 9 of first flow path 7 may also be formed as a common junction point, or junction points 9, 14 are disposed between check valve 10 of main flow path 7a of first flow path 7 and compressor 3 as separate elements.

Second evaporator 12 formed as the second refrigerant-to-coolant heat exchanger of refrigerant circuit 2 is configured to transfer heat from components of the drive train to the refrigerant of refrigerant circuit 2.

With flow control devices 6, 13, the mass flow of the refrigerant can be divided into partial mass flows through flow paths 7, 11. As such, the mass flow can be set continuously by evaporators 5, 12 between 0% and 100%. The partial mass flows are combined at junction point 9. Depending on the operating mode of system 1 and refrigerant circuit 2, compressor 3 draws the refrigerant from flow paths 7, 11 and conveys the refrigerant to third refrigerant-to-air heat exchanger 15.

A third flow control device 16 is disposed between third refrigerant-to-air heat exchanger 15 operated as a condenser/gas cooler for transferring heat to the supply air for the passenger compartment and first refrigerant-to-air heat exchanger 4 for transferring heat between the refrigerant and the ambient air, also referred to as an ambient heat exchanger. By means of third flow control device 16, first refrigerant-to-air heat exchanger 4 can be supplied with refrigerant at a high-pressure level, at a medium-pressure level or at a low-pressure level, as needed.

As such, on the one hand, the heat of a refrigerant present at a high-pressure level can either by transferred to the supply air for the passenger compartment and/or to the ambient pressure with first refrigerant-to-air heat exchanger 4 operated as a condenser/gas cooler and third refrigerant-to-air heat exchanger 15, respectively. Third flow control device 16 disposed between heat exchangers 4, 15 and formed as an expansion valve with a shut-off function can either by fully opened to let the refrigerant pass through with almost no pressure loss or can be set such as to continuously set the refrigerant to a medium pressure level present between the high-pressure level and the low-pressure level of refrigerant circuit 2. Hence, the amounts of heat to be transferred to the supply air for the passenger compartment and to the ambient air can be set in a targeted manner.

On the other hand, first refrigerant-to-air heat exchanger 4 can be supplied at a medium pressure level or at a low pressure level and thus operated as an evaporator by means of the setting of third flow control device 16. Consequently, by means of the setting of third flow control device 16 in first refrigerant-to-air heat exchanger 4, heat can be absorbed from or released to the refrigerant as needed, which can be controlled very precisely without the temperature of the supply air for the passenger compartment noticeably decreasing, for example.

Refrigerant circuit 2 also has a third flow path 17, extending from a branch-off point 18 to second flow control device 13 formed as a junction point. As such, branch-off point 18 is disposed between third refrigerant-to-air heat exchanger 15 and third flow control device 16 upstream of first refrigerant-to-air heat exchanger 4 in the flow direction of the refrigerant, while second flow control device 13 formed as a junction point is disposed within second flow path 11 upstream of refrigerant-to-coolant heat exchanger 12 in the flow direction of the refrigerant.

Second flow control device 13 is formed as a 3/2-way vale with a bilateral expansion function. As such, two ports A and B are each passed through by the refrigerant as an inlet and a port C is passed through by the refrigerant as an outlet at any given time. When passing through second flow control device 13 from one of ports A or B to port C, flow control device 13 can be operated as an expansion valve or with the full flow area, respectively, and thus almost without any pressure loss. Between ports A and C as well as B and C, flow control device 13 is formed as an expansion valve with a shutoff function in each case.

Furthermore, a check valve 19 can be formed between refrigerant-to-air heat exchanger 4 and branch-off point 8 to prevent backflow of refrigerant directed through third flow path 17 to refrigerant-to-air heat exchanger 4, depending on the operating mode of refrigerant circuit 2.

Refrigerant circuit 2 also has an accumulator 20 to separate and collect liquid refrigerant as well as various sensors 21a, 21b, 21c, 22a, 22b. Accumulator 20 is provided on the low-pressure side of refrigerant circuit 2 upstream of the inlet of compressor 3. Sensors 21a, 21b, 21c are formed as pressure/temperature sensors and sensors 22a, 22b are formed as temperature sensors.

As such, a first pressure/temperature sensor 21a is disposed for determining the pressure and temperature of the hot gas as well as for down-regulating the high pressure of the refrigerant at the outlet of compressor 3.

A second pressure/temperature sensor 21b provided downstream of first refrigerant-to-air heat exchanger 4 in the flow direction of the refrigerant is used, during operation of refrigerant circuit 2 in a heat pump mode, to regulate the temperature and/or the pressure of the refrigerant in refrigerant-to-air heat exchanger 4 as wells as, during operation of refrigerant circuit 2 in a post-heating mode, to regulate the medium-pressure level. The refrigerant can have conditions falling into the diphase region and can thus have vapor or liquid droplets. The capacity limitation is used in particular to avoid icing of the heat transfer surface of refrigerant-to-air heat exchangers 4.

A third pressure/temperature sensor 21c disposed downstream of refrigerant-to-coolant heat exchanger 12 in the flow direction of the refrigerant is configured to regulate the superheating of the refrigerant at the outlet of evaporator 12. Especially when operating refrigerant circuit 2 in a heat pump mode or post-heating mode and absorbing heat from the ambient air in refrigerant-to-air heat exchanger 4, refrigerant-to-coolant heat exchanger 12 might be operated with refrigerant at a slightly lower pressure level than refrigerant-to-air heat exchanger 4. In addition, there is the possibility that no heat is transferred in refrigerant-to-coolant heat exchanger 12 to refrigerant. In this case, compressor 3 must always be prevented from drawing in liquid refrigerant.

A first temperature sensor 22a disposed downstream of second refrigerant-to-air heat exchanger 5 in the flow direction of the refrigerant is provided for regulating the superheating of the refrigerant at the outlet of evaporator 5. Furthermore, during operation of refrigerant circuit 2 in a heat pump mode, a second temperature sensor 22b disposed downstream of third refrigerant-to-air heat exchanger 15 in the flow direction of the refrigerant is used to regulate the supercooling of the refrigerant.

The components of the drive train are temperature-controlled, in particular cooled, by means of at least one heat exchanger 23. As such, heat exchanger 23 can be formed as a part of a coolant circuit. Refrigerant-to-coolant heat exchanger 12 of refrigerant circuit 2 is also integrated with the coolant circuit. Refrigerant-to-coolant heat exchanger 12 thermally connects refrigerant circuit 2 to the coolant circuit. The heat transferred from the components of the drive train to the coolant is released to the refrigerant in refrigerant-to-coolant heat exchanger 12. Hence, the components of the drive train can be utilized as heat sources for refrigerant circuit 2. The coolant is conveyed by means of a conveying device not shown, specifically by a coolant pump, through the coolant circuit.

In this manner, thermal system 1 enables an operation in a heating mode and/or in a heat pump mode, for example, in which the waste heat absorbed by the coolant of the coolant circuit from the components of the drive train is provided as evaporation heat for the refrigerant in refrigerant-to-coolant heat exchanger 12. The functionality of heat recovery helps to improve the overall energy efficiency and heat efficiency of the motor vehicle.

FIG. 1 further shows an arrangement of third refrigerant-to-air heat exchanger 15 of refrigerant circuit 2 operated as a condenser/gas cooler and an ancillary thermal heat exchanger 35 for transferring heat to the supply air for the passenger compartment within an air-conditioning device 30.

Air-conditioning device 30 has a housing 31 with an inlet (not shown) for circulating air from the passenger compartment and an inlet (not shown) for fresh air from the environment. The inlets are opened and closed as needed by means of an air guiding device, wherein the flow areas of the inlets can be sealed or cleared continuously between 0% and 100%.

A mass airflow drawn in by a fan 32 through at least one of the inlets is first directed though second refrigerant-to-air heat exchanger 5 of refrigerant circuits 2 operated as an evaporator. Depending on the demand and position of an air guiding device 33, in particular a temperature flap, the air conditioned when passing through refrigerant-to-air heat exchanger 5 can, on the one hand, flow into a first flow channel 34 and thus through third refrigerant-to-air heat exchanger 15 of refrigerant circuit 2 operated as a condenser/gas cooler as well as ancillary thermal heat exchanger 35 and be heated. Third refrigerant-to-air heat exchanger 15 of refrigerant circuit 2 and ancillary thermal heat exchanger 35 are disposed to be supplied successively with the supply air for the passenger compartment and cover the complete flow area of first flow channel 34. Due to the arrangement within air-conditioning device 30, third refrigerant-to-air heat exchanger 15 is also referred to as an internal condenser/gas cooler. On the other hand, the air conditioned when passing through refrigerant-to-air heat exchanger 5 can be introduced into a second flow channel 36 which is formed as a bypass to first flow channel 34, and thus directed past heat exchangers 15, 35. The flow areas of flow channels 34, 36 can be closed or opened continuously between 0% and 100%. The mass flows of the supply air directed through flow channels 34, 36 are then guided in the flow direction into the passenger compartment in a mixed or unmixed state depending on the operating mode.

By means of ancillary thermal heat exchanger 35, preferably an additional electric heater, such as a resistance heater, or a heat exchanger of a coolant circuit, additional heat can be provided or a shortfall of heat can be compensated if needed and in the case of insufficient heat of the refrigerant.

FIGS. 2 to 5C show different operating modes of thermal system 1 of FIG. 1. The components of refrigerant circuit 2, in particular the corresponding refrigerant conduits, each supplied with refrigerant, are marked by solid lines. As such, the individual lines illustrate areas of refrigerant circuit 2 supplied with refrigerant at a high-pressure level, while double lines show areas of refrigerant circuit 2 supplied with refrigerant at a medium-pressure level or the low-pressure level. Components and sections of refrigerant circuit 2 not supplied are indicated by dashed lines.

Figure 2:
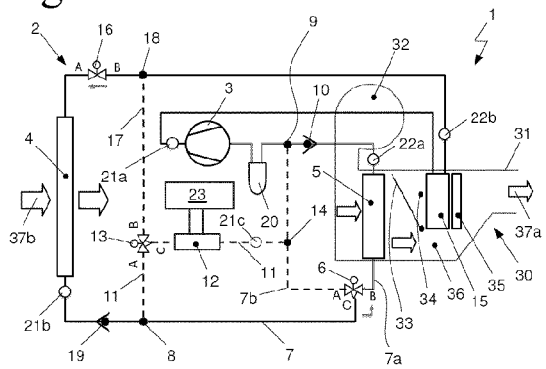
FIG. 2: in a refrigeration system mode for the supply air of the passenger compartment.

FIG. 2 shows thermal system 1 during operation in a refrigeration system mode for the supply air of the passenger compartment.

The supply air for the passenger compartment directed through air-conditioning device 30 in flow direction 37a is cooled and/or dehumidified when passing over the heat transfer surface of second refrigerant-to-air heat exchangers 5 operated as an evaporator. Air guiding device 33 is disposed to close first flow channel 34. Third refrigerant-to-air heat exchanger 15 is not supplied with supply air which is directed through second flow channel 36 past heat exchangers 15, 35. Hence, heat is neither transferred in third refrigerant-to-air heat exchanger 15 nor in ancillary thermal heat exchanger 35.

Third flow control device 16 disposed between third refrigerant-to-air heat exchanger 15 and first refrigerant-to-air heat exchanger 4 operated as a condenser/gas cooler is fully opened so that the refrigerant passed flow control device 16 without any pressure loss. The heat to be dissipated by the refrigerant from refrigerant circuit 2 is fully transferred to the ambient air directed in the flow direction 37b in first refrigerant-to-air heat exchanger 4. Third flow path 17 is closed and is not passed through by refrigerant.

In first flow control device 6 upstream of first evaporator 5 in the flow direction of the refrigerant, the refrigerant is decompressed to the low-pressure level when passing through port C to port B and evaporated with absorption of heat when passing through first evaporators 5. First flow control device 6 operated as an expansion member between ports C and B is also used for the required limitation of the mass flow of the refrigerant to set a desired superheating of the refrigerant at the outlet of evaporator 5. Between ports C and A, first flow control device 6 is closed so that bypass flow path 7b of first flow path 7 is not passed through by refrigerant.

In addition, second flow control device 13 upstream of second evaporator 12 in the flow direction of the refrigerant is closed, so that second evaporator 12 is not supplied with refrigerant.

Figure 3:
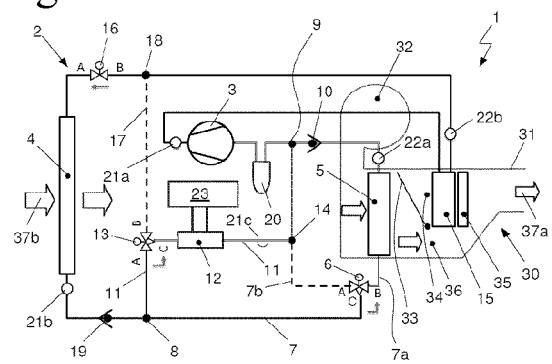
FIG. 3: in a refrigeration system mode for the supply air of the passenger compartment as wells as a cooling mode of components of the drive train.

FIG. 3 shows thermal system 1 during operation in the refrigeration system mode for the supply air of the passenger compartment, similar to the operating mode shown in FIG. 2, as well as a cooling mode of components of the drive train.

Contrary to the operating mode according to FIG. 2, both first flow control device 6 of first evaporator 5 between ports C and B and second flow control device 13 of second evaporator 12 between ports A and C are opened and are each operated as expansion members, so that the mass flow of the refrigerant is divided into a partial mass flow through first flow path 7 and a partial mass flow through second flow path 11 and each decompressed to the low-pressure level. Second flow control device 13 operated as an expansion member between ports A and C is also used for the required limitation of the mass flow of the refrigerant to set a desired superheating of the refrigerant at the outlet of evaporator 12. In each case, the refrigerant is evaporated with absorption of heat when passing through evaporator 5, 12. The partial mass flows through flow paths 7, 11 are mixed at junction point 9. Flow paths 7, 11 and hence evaporators 5, 12 are supplied with refrigerant in parallel.

The coolant of the coolant circuit is circulated between heat exchanger 23 of the components of the drive train and refrigerant-to-coolant heat exchanger 12 operated as evaporator 12 of refrigerant circuit 2, so that the heat dissipated in heat exchanger 23 from the components of the drive train and absorbed by the coolant in refrigerant-to-coolant heat exchanger 12 is fully transferred to the refrigerant.

Figure 4:
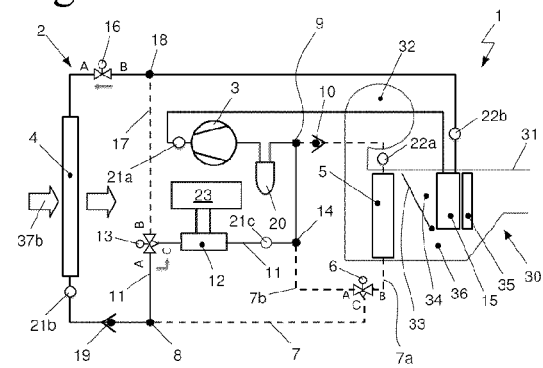
FIG. 4: in a cooling mode of components of the drive train.

FIG. 4 shows thermal system 1 during operation in a cooling mode of components of the drive train, similar to the operating mode shown in FIG. 3.

Contrary to the operating mode according to FIG. 3, the refrigerant is only decompressed in second flow control device 13 of second evaporator 12 to the low-pressure level and evaporated with absorption of heat when passing through second evaporator 12. In contrast, first flow control device 6 of first evaporator 5 is fully closed. First evaporator 5 is not supplied with refrigerant. In addition, there is no mass airflow conveyed through air-conditioning device 30.

Hence, heat is also not dissipated from the refrigerant in third refrigerant-to-air heat exchanger 15. Third flow control device 16 disposed between third refrigerant-to-air heat exchanger 15 and first refrigerant-to-air heat exchanger 4 operated as a condenser/gas cooler is fully opened so that the refrigerant passed flow control device 16 without any pressure loss. The heat to be dissipated by the refrigerant from refrigerant circuit 2 is fully transferred to the ambient air directed in the flow direction 37b in first refrigerant-to-air heat exchanger 4. Third flow path 17 is closed and is not passed through by refrigerant.

The coolant of the coolant circuit is circulated between heat exchanger 23 of the components of the drive train and refrigerant-to-coolant heat exchanger 12 operated as evaporator 12 of refrigerant circuit 2, so that the heat dissipated in heat exchanger 23 from the components of the drive train and absorbed by the coolant in refrigerant-to-coolant heat exchanger 12 is fully transferred to the refrigerant.

Thermal system 1 is primarily operated during a charging operation of the battery at a charging station in the cooling mode of the components of the drive train.

Figure 5A:
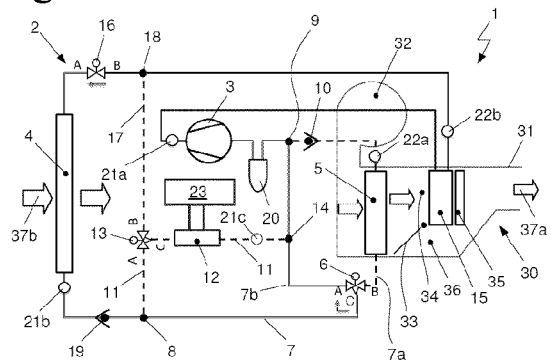
FIG. 5A: in a heat pump mode for heating the supply air of the passenger compartment with absorption of heat from the ambient.

FIG. 5A illustrates thermal system 1 during operation in a heat pump mode and/or heating mode for heating the supply air of the passenger compartment with absorption of heat from the ambient air.

The condition of the supply air for the passenger compartment directed through air-conditioning device 30 in flow direction 37a is not changed when passing over the heat transfer surface of second refrigerant-to-air heat exchanger 5. Third refrigerant-to-air heat exchanger 15 is supplied with the supply air which is directed through first flow channel 34 and hence over the heat transfer surfaces of heat exchangers 15, 35. In third refrigerant-to-air heat exchanger 15, heat from the refrigerant is transferred to the supply air for the passenger compartment. The supply air is heated. By starting ancillary thermal heat exchanger 35, the supply air can be heated further. Air guiding device 33 is disposed to close second flow channel 36.

When passing through third flow control device 16 disposed between third refrigerant-to-air heat exchanger 15 and first refrigerant-to-air heat exchanger 4, operated as an expansion organ, the refrigerant is decompressed from the high-pressure level to the low-pressure level, and when passing through first refrigerant-to-air heat exchanger 4 operated as an evaporator, it is evaporated with absorption of heat from the ambient air directed in flow direction 37b. Third flow path 17 is closed and is not passed through by refrigerant. Independently of the given operating mode, the refrigerant flows in an unchanged direction through first refrigerant-to-air heat exchanger 4.

First flow control device 6 upstream of first evaporator 5 in the flow direction of the refrigerant is closed between ports C and B, so that main flow path 7a of first flow path 7 with first evaporator 5 is not passed through by refrigerant. Between ports C and A, first flow control device 6 is open so that bypass flow path 7b of first flow path 7 is passed through by refrigerant as a bypass around first evaporator 5.

In addition, second flow control device 13 upstream of second evaporator 12 in the flow direction of the refrigerant is fully closed both between ports B and C and between ports B and C, so that second evaporator 12 is not supplied with refrigerant.

Hence, neither second refrigerant-to-air heat exchanger 5 nor refrigerant-to-coolant heat exchanger 12 is passed through by refrigerant, minimizing the pressure loss of the refrigerant. Check valves 10, 19 prevent an undesired displacement of refrigerant into areas of the refrigerant circuit not supplied with refrigerant.

Depending on the given conditions, in particular the values of the air temperatures of the environment as well as in the passenger compartment and/or the cooling demand of the components of the drive train, the mass flow of the refrigerant can be divided with the help of the positions of the flow control devices 6, 13, 16 operated as expansion members in particular of heat exchangers 4, 5, 12 operated as an evaporator.

Figure 5B:
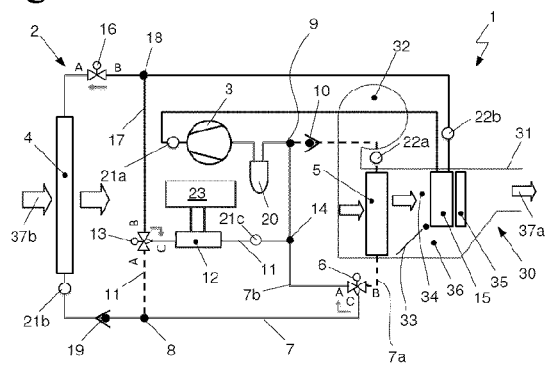
FIG. 5B: in a heat pump mode for heating the supply air of the passenger compartment with absorption of heat from the ambient air as well as from components of the drive train.

FIG. 5B shows thermal system 1 during operation in a heat pump mode and/or heating mode for heating the supply air of the passenger compartment as well as a cooling mode of components of the drive train, i.e., with absorption of heat of the components of the drive train. Contrary to the operating mode according to FIG. 5A, apart from the ambient air, the components of the drive train also serve as a heat source for the refrigerant. The operation within air-conditioning device 30 remains unchanged.

The essential difference of the operating modes according to FIG. 5A and FIG. 5B is the switching of second flow control device 13. Flow control device 13 is switched such that the flow passage from port B to port C is open, while the flow passage from port A to port C is closed. When passing through flow control device 13, the refrigerant is decompressed from the high-pressure level to the low-pressure level, and when passing through refrigerant-to-coolant heat exchanger 12 operated as an evaporator, it is evaporated with absorption of heat from the components of the drive train, in particular the battery.

With flow control devices 13, 16, the mass flow of the refrigerant is divided at branch-off point 18 into partial mass flows through first refrigerant-to-air heat exchanger 4 as well as first flow path 7, on the one hand, and through third flow path 17 as well as second flow path 11 with refrigerant-to-coolant heat exchanger 12, on the other hand. As such, the mass flow can be set continuously by heat exchangers 4, 12 operated as evaporators between 0% and 100%. The partial mass flows are combined at junction point 14 of bypass flow path 7b of first flow path 7. Compressor 3 draws refrigerant from bypass flow path 7b and conveys the refrigerant to third refrigerant-to-air heat exchanger 15.

Figure 5C:
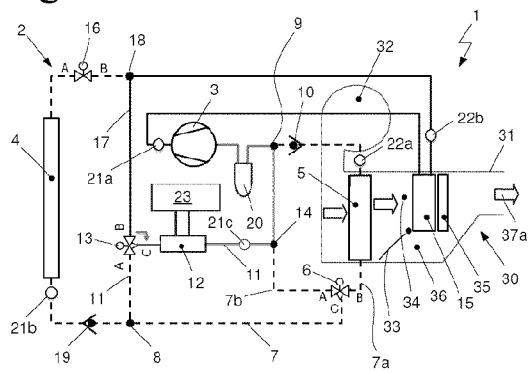
FIG. 5C: in a heat pump mode for heating the supply air of the passenger compartment with absorption from components of the drive train.

FIG. 5C shows thermal system 1 during operation in a heat pump mode and/or heating mode for heating the supply air of the passenger compartment as well as a cooling mode of components of the drive train, i.e., with absorption of heat of the components of the drive train. Contrary to the operating mode according to FIG. 5B, the ambient air does not serve as a heat source for the refrigerant. The operation within air-conditioning device 30 remains unchanged.

The essential difference of the operating modes according to FIG. 5B and FIG. 5C is the switching of third flow control device 16. Third flow control device 16 is closed, so that first refrigerant-to-air heat exchanger 4 is not supplied with refrigerant. The total mass flow of the refrigerant present at the high-pressure level is directed through third flow path 17 to second flow control device 13.

When passing through second flow control device 13 from port B to port C, the refrigerant is decompressed from the high-pressure level to the low-pressure level, and when passing through refrigerant-to-coolant heat exchanger 12 operated as an evaporator, it is evaporated with absorption of heat from the components of the drive train, in particular the battery.

As there is sufficient heat available from the components of the drive train to heat the supply air of the passenger compartment, there is no heat absorbed from the ambient air. A potentially high temperature of the heat source, in particular of a coolant of a coolant circuit, causes a particularly efficient operation of system 1 in the heat pump mode with, at the same time, minimum speed of compressor 3 and thus minimum noise emissions.

On the one hand, the coolant circuit for controlling the temperature of the components of the drive train can be switched to active cooling of the battery both in the operating mode according to FIG. 5B and in the operating mode according to FIG. 5C, for example. On the other hand, in particular in the operating mode shown in FIG. 5C, the coolant circuit can be switched such that the waste heat from other electronic components, such as the electric motor, the power electronics or the charger, is utilized as a heat source.

The operation of refrigerant circuit 2 in one of the heat pump modes shows in FIGS. 5A to 5C is very efficient and increases the purely electric range of the relevant motor vehicle with at least partial electric drive. The heating of the supply air for the passenger compartment can be assisted by ancillary thermal heat exchanger 35 in air-conditioning device 30, in particular an electric resistance heater and/or high-voltage PTC.

Figure 6A:
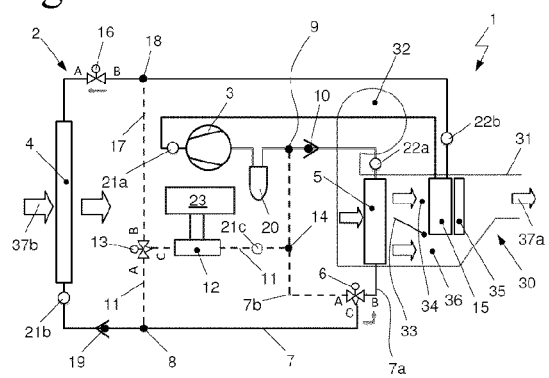
FIG. 6A: in a post-heating mode for the supply air of the passenger compartment with additional transfer of heat to the ambient air.

FIG. 6A shows thermal system 1 during operation in a post-heating mode for the supply air of the passenger compartment. As such, as with the operation in the refrigeration system mode for the supply air of the passenger compartment according to FIG. 2, refrigerant circuit 2 is passed through by refrigerant.

The essential difference of the operating modes according to FIG. 2 and FIG. 6A is the setting of air guiding device 33 within air-conditioning device 30. The supply air for the passenger compartment directed through air-conditioning device 30 in flow direction 37a is cooled and dehumidified when passing over the heat transfer surface of second refrigerant-to-air heat exchangers 5 operated as an evaporator. Air guiding device 33 is disposed to at least partially open first flow channel 34, so that the cooled and dehumidified mass flow of the air is divided into a first partial mass flow through first flow channel 34 with third refrigerant-to-air heat exchanger 15 and a second partial mass flow through second flow channel 36. Hence, in third refrigerant-to-air heat exchanger 15 operated as a condenser/gas cooler, heat is transferred from the refrigerant to the supply air. The supply air previously cooled and dehumidified is reheated.

Third flow control device 16 disposed between third refrigerant-to-air heat exchanger 15 and first refrigerant-to-air heat exchanger 4 also operated as a condenser/gas cooler is fully opened so that the refrigerant passed flow control device 16 without any pressure loss. Consequently, a first part of the heat to be dissipated by the refrigerant from refrigerant circuit 2 is transferred to the supply air for the passenger compartment when passing through third refrigerant-to-air heat exchanger 15, while a second part of the heat to be dissipated by the refrigerant from refrigerant circuit 2 is transferred to the ambient air directed in flow direction 37b when passing through first refrigerant-to-air heat exchanger 4, without influencing the target temperature of the supply air for the passenger compartment. Third flow path 17 is closed and is not passed through by refrigerant.

A part of the heat absorbed when passing through first evaporator 5 during evaporation of the refrigerant from the refrigerant at the low-pressure level can then be utilized for reheating the supply air for the passenger compartment.

Alternatively, the pressure level of the refrigerant within first refrigerant-to-air heat exchanger 4 can be regulated by means of third flow control device 16 depending on the temperature of the ambient air. As such, a pressure of the refrigerant below that corresponding to the temperature of the ambient air can be set according to the operating mode shown in FIG. 6B, for example, to operate first refrigerant-to-air heat exchanger 4 as an evaporator and absorb heat from the ambient air.

Similarly, a pressure of the refrigerant corresponding to the temperature of the ambient air can be set, so that heat is not transferred. The corresponding pressure level is set by adjusting flow control devices 6, 16.

Figure 6B:
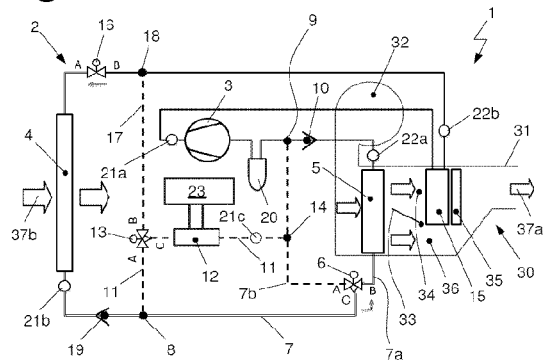
FIG. 6B: in a post-heating mode for the supply air of the passenger compartment with additional absorption of heat from the ambient air.
Figure 6C:
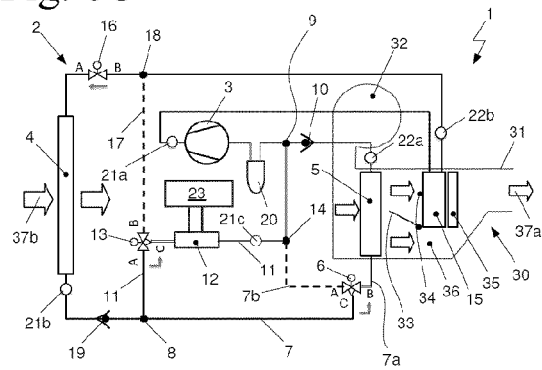
FIG. 6C: in a post-heating mode for the supply air of the passenger compartment with additional transfer of heat to the ambient air as well as a cooling mode of components of the drive train.

FIG. 6C illustrates thermal system 1 during operation in a post-heating mode for the supply air of the passenger compartment with additional transfer of heat to the ambient air, similar to the operating mode shown in FIG. 6A, as well as a cooling mode of components of the drive train, i.e., with absorption of heat of the components of the drive train. In turn, the operation within air-conditioning device 30 remains unchanged.

Contrary to the operating mode shown in FIG. 6A, both first flow control device 6 of first evaporator 5 and second first flow control device 13 of second evaporator 12 are opened such that the mass flow of the refrigerant is divided at branch-off point 8 into a partial mass flow through first flow path 7, in particular main flow path 7a with first evaporator 5, and a partial mass flow through second flow path 11 with second evaporator 12 and decompressed to the low-pressure level in each case. First flow control device 6 is passed through from port C to port B, while second flow control device 13 is passed through from port A to port C.

In each case, the refrigerant is evaporated with absorption of heat when passing through evaporator 5, 12. The partial mass flows through flow paths 7, 11 are mixed at junction point 9. Flow paths 7, 11 and hence evaporators 5, 12 are supplied with refrigerant in parallel.

The components of the drive train and the supply air for the passenger compartment serve as heat sources for the refrigerant circuit. As such, the respective amounts of heat to be absorbed are set as needed and/or according to priority.

Depending on the adjustment of flow control devices 6, 13, 16, independently of the target temperature of the supply air to be supplied to the passenger compartment, first refrigerant-to-air heat exchanger 4 can also be operated as a heat sink or heat source for the refrigerant. Thus, with third flow control device 16 fully open, according to the operating mode shown in FIG. 6C, a part of the heat to be dissipated by the refrigerant from refrigerant circuit 2 when passing through first refrigerant-to-air heat exchanger 4 can be released to the ambient air directed in flow direction 37b.

Alternatively, a pressure of the refrigerant corresponding to the temperature of the ambient air can be set so that heat is not transferred or the pressure level of the refrigerant is set to a value below that corresponding to the temperature of the ambient air, according to the operating mode shown in FIG. 6D, to operate first refrigerant-to-air heat exchanger 4 as an evaporator and absorb heat from the ambient air.

Figure 6D:
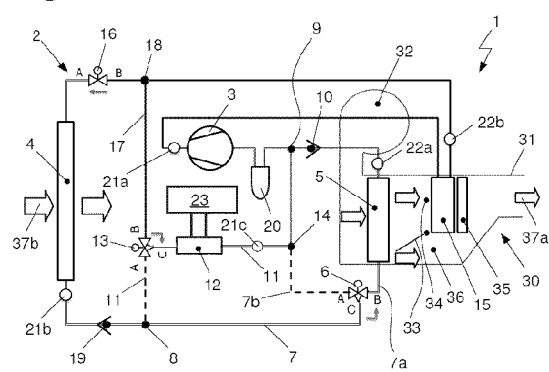
FIG. 6D: in a post-heating mode for the supply air of the passenger compartment with additional absorption of heat from the ambient air as well as a cooling mode of components of the power train.

FIG. 6D shows thermal system 1 during operation in a post-heating mode for the supply air of the passenger compartment with additional absorption of heat from the ambient air, similar to the operating mode shown in FIG. 6B, as well as a cooling mode of components of the drive train, i.e., with absorption of heat of the components of the drive train. The operation within air-conditioning device 30 remains unchanged.

The essential difference of the operating modes according to FIG. 6B and FIG. 6D is the switching of second flow control device 13. Flow control device 13 is switched such that the flow passage from port B to port C is open, while the flow passage from port A to port C is closed. When passing through flow control device 13, the refrigerant is decompressed from the high-pressure level to the low-pressure level and, when passing through refrigerant-to-coolant heat exchanger 12 operated as an evaporator, it is evaporated with absorption of heat from the components of the drive train.

With flow control devices 13, 16, the mass flow of the refrigerant is divided at branch-off point 18 into partial mass flows through first refrigerant-to-air heat exchanger 4 as well as first flow path 7, on the one hand, and through third flow path 17 as well as second flow path 11 with refrigerant-to-coolant heat exchanger 12, on the other hand. As such, the mass flow can be set continuously by heat exchangers 4, 12 operated as evaporators between 0% and 100%. The partial mass flows are combined at junction point 9.

The division of the mass flows reduces the respective pressure losses which occur, as only partial mass flows are directed though the components such that system 1, in particular at external temperatures in the single-digit range, is operable with high efficiency and capacity.

The operation of refrigerant circuit 2 in one of the post-heating modes shows in FIGS. 6A to 6D is very efficient and increases the purely electric range of the relevant motor vehicle with at least partial electric drive.

Figure 7:
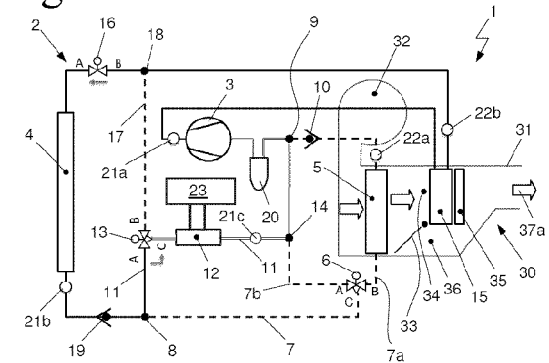
FIG. 7: in a de-icing mode of the first refrigerant-to-air heat exchanger operated as a condenser/gas cooler.

FIG. 7 shows thermal system 1 during operation in a de-icing mode of first refrigerant-to-air heat exchanger 4 operated as a condenser/gas cooler in this mode, which is applied if, during operation of system 1, for example in one of the modes described above, due to a malfunction or due to overload of the heat pump mode or the post-heating mode, in which first refrigerant-to-air heat exchanger 4 is operated as an evaporator for absorbing heat in refrigerant circuit 2, and the heat transfer surface of heat exchanger 4 ices up. The layer of ice formed on the heat transfer surface of heat exchanger 4 reduces the heating capacity of system 1. System 1 is operated inefficiently. To eliminate the layer of ice formed on the heat transfer surface of heat exchanger 4, first refrigerant-to-air heat exchanger 4 is operated as a condenser/gas cooler despite the heating demand for the supply air of the passenger compartment and supplied with refrigerant at a high-pressure level. With absorption of heat from by the refrigerant, the layer of ice formed on the heat transfer surface of heat exchanger 4 is thawed.

Third flow control device 16 disposed between third refrigerant-to-air heat exchanger 15 and first refrigerant-to-air heat exchanger 4 operated as a condenser/gas cooler is fully opened so that the refrigerant passed flow control device 16 without any pressure loss. At least a first part of the refrigerant of the heat to be dissipated from refrigerant circuit 2 is utilized in first refrigerant-to-air heat exchanger 4 to thaw the layer of heat. A second part of the heat to be dissipated by the refrigerant from refrigerant circuit 2 can be transferred to the supply air for the passenger compartment conveyed through air-conditioning device 30 in flow direction 37a when passing through third refrigerant-to-air heat exchanger 15. As such, air guiding device 33 is disposed to close second flow channel 36. To accelerate the thawing process, the entire heat to be dissipated by the refrigerant from refrigerant circuit 2 in first refrigerant-to-air heat exchanger 4 can be employed to thaw the layer of ice. As such, there is no mass airflow directed through air-conditioning device 30. Third flow path 17 is closed and is not passed through by refrigerant.

First flow control device 6 of first evaporator 5 is fully closed. First evaporator 5 is not supplied with refrigerant. The condition of a supply air for the passenger compartment directed through air-conditioning device 30 in flow direction 37a depending on the operating mode is not changed when passing over the heat transfer surface of second refrigerant-to-air heat exchanger 5. When passing through refrigerant-to-coolant heat exchanger 12 operated as an evaporator, the refrigerant is evaporated with absorption of heat by the components of the drive train. Consequently, the components of the drive train serve as a heat source for thawing first refrigerant-to-air heat exchanger 4.

Depending on the demand and operating mode, the supply air can be heated or further heated by starting ancillary thermal heat exchanger 35.

Figure 8:
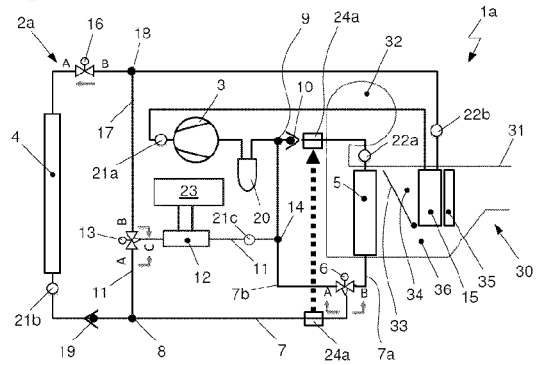
FIG. 8: shows a refrigerant circuit for conditioning the supply air for the passenger compartment as well as for cooling components of the drive train similar to FIG. 1 with an internal heat exchanger.

The operating modes described in FIGS. 2 to 7 with reference to the embodiment of system 1 according to FIG. 1, can also be illustrated with thermal system 1a shown in FIG. 8 which is different in having an internal heat exchanger 24a formed in refrigerant circuit 2a.

FIG. 8 shows a thermal system 1a with a refrigerant circuit 2a for conditioning the supply air for the passenger compartment as well as for cooling components of the drive train of a motor vehicle.

On the high-pressure side, internal heat exchanger 24a, also referred to as a heat exchanger inside a circuit, disposed within first flow path 7 between branch-off point 8 and first flow control device 6 upstream of first flow control device 6 of second refrigerant-to-air heat exchanger 5 operated as an evaporator in the flow direction of the refrigerant. On the low-pressure side, internal heat exchanger 24a is formed within main flow path 7a of first flow path 7 downstream of second refrigerant-to-air heat exchanger 5 operated as an evaporator.

Amongst others, internal heat exchanger 24a is used for the reduction of the capacity of compressor 3, in particular during operation of system 1a in a refrigeration system mode or a post-heating mode. In addition, the specific refrigerating capacity of second refrigerant-to-air heat exchanger 5 operated as a first evaporator is increased in comparison to the specific refrigerating capacity of refrigerant-to-coolant heat exchanger 12 operated as a second evaporator to the benefit of the comfort of the passenger compartment without structural changes to air-conditioning device 30.

By forming internal heat exchanger 24a, the efficiency of the operation of system 1a is increased in comparison to system 1, and reducing the power demand of electrically driven compressor 3 increases the purely electric range of the corresponding motor vehicle with at least partial electric drive.

Figure 9:
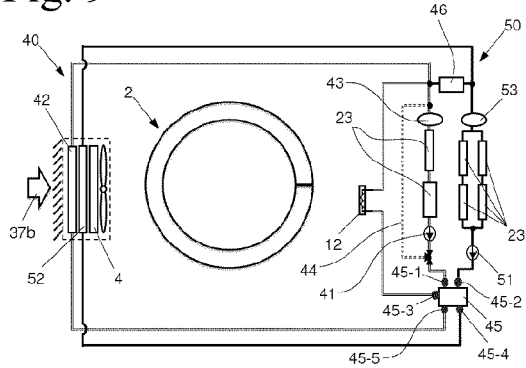
FIG. 9: shows a coolant circuit system of the thermal system with a flow control device for connecting two coolant circuits operable separately, as well as FIG. 10A: shows a perspective view of the flow control device of the coolant circuit system.

FIG. 9 shows a coolant circuit system of thermal system 1, in particular for temperature control, especially for cooling, of components of the drive train, preferably of the electric drive train, with a flow control device 45 for connecting two coolant circuits 40, 50 operable separately from each other. The coolant circuit system is thermally coupled to refrigerant circuit 2 via refrigerant-to-coolant heat exchanger 12 operated as an evaporator for the refrigerant. In refrigerant-to-coolant heat exchanger 12, heat is transferred from the coolant to the refrigerant.

Apart from a conveying device 41, in particular a coolant pump, a first coolant circuit 40 has heat exchangers 23 of the components of the electric drive train, in particular the high-voltage battery and the inverter, supplied with coolant in series one after the other as well as a coolant-to-air heat exchanger 42 for transferring heat from the ambient air. As such, refrigerant-to-coolant heat exchanger 12 and coolant-to-air heat exchanger 42 are disposed to be passed through by coolant in parallel or separately from each other. A temperature sensor 43 is provided in the flow direction of the coolant upstream of heat exchangers 23 of the components of the electric drive train. In addition, first coolant circuit 40 is formed with a bypass 44 for heat exchangers 23 of the components of the electric drive train.

In particular for harmonizing the individual cell temperatures of the high-voltage battery, the corresponding heat exchanger 23 can be permanently passed through by coolant which can be directed starting from conveying device 41 through bypass 44 back to heat exchangers 23, without supplying other components of coolant circuit 40 with coolant. As such, conveying device 41 is operated at low capacity.

Apart from a conveying device 51, in particular a coolant pump, a second coolant circuit 50 has further heat exchangers 23 of the components of the electric drive train, in particular the internal charger, the power electronics or the electric motor, suppliable with coolant in series or in parallel to each other as well as a coolant-to-air heat exchanger 52 for transferring heat to the ambient air. A temperature sensor 53 is provided in the flow direction of the coolant upstream of heat exchangers 23.

In the area of temperature sensors 43, 53, coolant circuits 40, 50 are also connected to each other by a degassing vessel 46.

Coolant-to-air heat exchanger 42 of first coolant circuit 40, coolant-to-air heat exchanger 52 of second coolant circuit 50 and first refrigerant-to-air heat exchanger 4 of refrigerant circuit 2 are disposed successively in the front section of the motor vehicle in flow direction 37b of the ambient air.

Flow control device 45 formed as a multi-way valve has five ports 45-1, 45-2, 45-3, 45-4, 45-5 for connection to fluid lines of refrigerant circuits 40, 50. As such, ports 45-1, 45-3, 45-5 are coupled to fluid lines of first coolant circuits 40 and ports 45-2, 45-4 coupled to fluid lines of second coolant circuit 50.

Figure 10A:
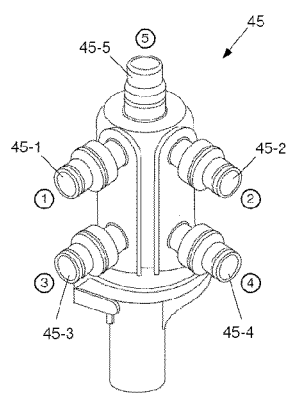
FIG. 10B: shows switching modes of the flow control device of the coolant circuit system.

FIG. 10A illustrates a perspective view of flow control device 45 of the coolant circuit system.

Figure 10B:
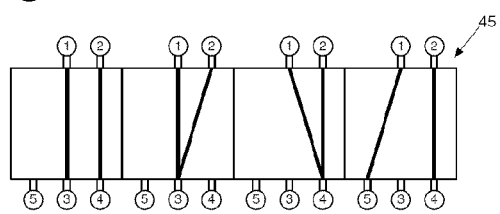

FIG. 10B shows different switching modes of the flow control device 45 of the coolant circuit system connecting coolant circuits 40, 50 to each other.

In a first operating mode, also referred to as active battery cooling, a passage path is open between first port 45-1 and third port 45-3 as well as between second port 45-2 and fourth port 45-4, respectively. Both conveying devices 41, 51 are in operation. As such, the heat transferred from the battery and/or the inverter to the coolant of first coolant circuit 40 is dissipated to the refrigerant in refrigerant-to-coolant heat exchanger 12. Coolant-to-air heat exchanger 42 of first coolant circuit 40 is not supplied with coolant. The heat transferred from the internal charger, the power electronics and/or the electric motor to the coolant of second coolant circuit 50 is dissipated to the ambient air in coolant-to-air heat exchanger 52 of second coolant circuit 50.

In a second operating mode a passage path is open between first port 45-1 and third port 45-3 as well as between second port 45-2 and third port 45-3, respectively. Both conveying devices 41, 51 are in operation. As such, both the heat actively transferred from the battery and/or the inverter to the coolant of first coolant circuit 40 and the heat transferred from the internal charger, the power electronics and/or the electric motor to the coolant of second coolant circuit 50 dissipated to the refrigerant in refrigerant-to-coolant heat exchanger 12. The waste heat of the components of the electric drive train is utilized as heat sources for heating the supply air of the passenger compartment.

Coolant-to-air heat exchangers 42, 52 of coolant circuits 40, 50 are not supplied with coolant. The partial mass flows of the coolant mixed in flow control device 45 are divided at a branch-off point upstream of degassing vessel 46 in the flow direction of the coolant into a first partial mass flow for cooling the battery to conveying device 41 of first coolant circuit 40 and a second partial mass flow for cooling the electric motor to conveying device 51 of second coolant circuit 50.

In a third operating mode, a passage path is open between first port 45-1 and fourth port 45-4 as well as between second port 45-2 and fourth port 45-4, respectively. Both conveying devices 41, 51 are in operation.

In a fourth operating mode, also referred to as passive battery cooling, a passage path is open between first port 45-1 and fifth port 45-5 as well as between second port 45-2 and fourth port 45-4, respectively. Both conveying devices 41, 51 are in operation. As such, the heat transferred from the battery and/or the inverter to the coolant of first coolant circuit 40 is dissipated to the ambient air in refrigerant-to-air heat exchanger 42 of first coolant circuit 40. The heat transferred from the internal charger, the power electronics and/or the electric motor to the coolant of second coolant circuit 50 is discharged to the ambient air in coolant-to-air heat exchanger 52 of second coolant circuit 50. Coolant circuits 40, 50 are operated separately from each other, the coolant of coolant circuits 40, 50 is segregated.

LIST OF REFERENCE NUMERALS

TABLE 1

| | |
|---|---|
| 1, 1a | System |
| 2, 2a | Refrigerant circuit |
| 3 | Compressor |
| 4 | First refrigerant-to-air heat exchanger |
| 5 | Second refrigerant-to-air heat exchanger, first evaporator |
| 6 | First flow control device |
| 7 | First flow path |
| 7a | Main flow path |
| 7b | Bypass flow path |
| 8 | Branch-off point |
| 9 | Junction point |
| 10 | Check valve |
| 11 | Second flow path |
| 12 | Refrigerant-to-coolant heat exchanger, second evaporator |
| 13 | Second flow control device |
| 14 | Junction point |
| 15 | Third refrigerant-to-air heat exchanger, condenser/gas cooler |
| 16 | Third flow control device |
| 17 | Third flow path |
| 18 | Branch-off point |
| 19 | Check valve |
| 20 | Accumulator |
| 21a, 21b, 21c | Pressure/temperature sensor |
| 22a, 22b | Temperature sensor |
| 23 | Drive train components heat exchanger |
| 24a | Internal heat exchanger |
| 30 | Air-conditioning device |
| 31 | Housing |
| 32 | Fan |
| 33 | Air guiding device |
| 34 | First flow channel |
| 35 | Ancillary thermal heat exchanger |
| 36 | Second flow channel |
| 37a | Supply air flow direction |
| 37b | Ambient air flow direction |
| 40 | First coolant circuit |
| 41 | Conveying device of first coolant circuit 40 |
| 42 | Coolant-to-air heat exchanger of first coolant circuit 40 |
| 43 | Temperature sensor of first coolant circuit 40 |
| 44 | Bypass |
| 45 | Flow control device |
| 45-1-45-5 | Port of flow control device 45 |
| 46 | Degassing vessel |
| 50 | Second coolant circuit |
| 51 | Conveying device of second coolant circuit 50 |
| 52 | Coolant-to-air heat exchanger of second coolant circuit 50 |
| 53 | Temperature sensor of second coolant circuit 50 |

The invention claimed is:

1. A thermal system for conditioning a supply air for a passenger compartment and for cooling components of a drive train of a motor vehicle, having a coolant circuit, the thermal system comprising:
   a compressor;
   a first refrigerant-to-air heat exchanger for transferring heat via ambient air, which is formed to be operable as a condenser/gas cooler and an evaporator;
   a second refrigerant-to-air heat exchanger operated as a first evaporator with an upstream first flow control device;
   a heat exchanger operated as a second evaporator with an upstream second flow control device;
   a third refrigerant-to-air heat exchanger operated as a condenser/gas cooler for heating the supply air for the passenger compartment as well as a third flow control device, which are formed between the compressor and the first refrigerant-to-air heat exchanger, wherein the third flow control device is formed downstream of the third refrigerant-to-air heat exchanger in a flow direction of a refrigerant, wherein the second refrigerant-to-air heat exchanger with the upstream first flow control device is disposed within a first flow path and the heat exchanger with the upstream second flow control device is disposed within a second flow path, each of which are formed to extend from a first branch-off point to a junction point, wherein the first flow control device is formed as a second branch-off point from which a main flow path and a bypass flow path of the first flow path are each formed to extend to the junction point, the second flow control device is formed as a junction point and a third flow path is formed to extend from a third branch-off point to the second flow control device, wherein the third branch-off point is disposed between the third refrigerant-to-air heat exchanger and the third flow control device.

2. The thermal system according to claim 1, wherein the second refrigerant-to-air heat exchanger is disposed within the main flow path of the first flow path and the bypass flow path of the first flow path is formed as a bypass for the second refrigerant-to-air heat exchanger.

3. The thermal system according to claim 1, wherein the first flow control device is formed as a 3/2-way valve with three ports, port A, port B, and port C, and a unilateral expansion function, wherein the first flow control device is formed as an expansion valve between the port C formed as an inlet and the port B formed as an outlet and is formed as a shut-off valve between the port C formed as an inlet and the port A formed as an outlet, wherein the main flow path is connected to the port B and the bypass flow path is connected to the port A.

4. The thermal system according to claim 1, wherein the second flow control device is formed as a 3/2-way valve with three ports, port A, port B, and port C, and a bilateral expansion function, wherein the second flow control device is formed as an expansion valve between the port A and the port B, each formed as an inlet and the port C formed as an outlet, wherein the heat exchanger is disposed within the second flow path downstream of the port C in the flow direction of the refrigerant.

5. The thermal system according to claim 1, wherein the third flow control device is formed as an expansion valve.

6. The thermal system according to claim 1, wherein the heat exchanger operated as a second evaporator is formed as a refrigerant-to-coolant heat exchanger and is disposed within the coolant circuit having at least one heat exchanger for cooling the components of the drive train.

7. The thermal system according to claim 1, wherein the coolant circuit is formed with an internal heat exchanger for heat transfer between the refrigerant at high pressure and the refrigerant at low pressure, wherein, on a low-pressure side, the internal heat exchanger is disposed within the first flow path downstream of the second refrigerant-to-air heat exchanger operated as the first evaporator in the flow direction of the refrigerant.

8. The thermal system according to claim 7, wherein, on a high-pressure side, the internal heat exchanger is disposed between the first refrigerant-to-air heat exchanger and the first branch-off point of the first flow path and the second flow path.

9. The thermal system according to claim 7, wherein, on a high-pressure side, the internal heat exchanger is disposed within the first flow path upstream of the first flow control device in the flow direction of the refrigerant.

10. A method of operating the thermal system of the motor vehicle for operation in a refrigeration system mode, in a heat pump mode and in a post-heating mode for the supply air of the passenger compartment to be conditioned according to claim 1, wherein, during operation in the heat pump mode or the post-heating mode, the refrigerant is decompressed for heating the supply air of the passenger compartment when passing through the third flow control device disposed between the third refrigerant-to-air heat exchanger and the first refrigerant-to-air heat exchanger from a high-pressure level to a low-pressure level or to a medium-pressure level and is evaporated, when passing through the first refrigerant-to-air heat exchanger operated as the evaporator, with absorption of heat from the ambient air, wherein heat is transferred from the refrigerant to the supply air for the passenger compartment when passing through the third refrigerant-to-air heat exchanger.

11. The method according to claim 10, wherein, when passing through a flow passage of the second flow control device, the refrigerant is decompressed from the high-pressure level to the low-pressure level and, when passing through the heat exchanger operated as the second evaporator, is evaporated with absorption of heat, wherein a mass flow of the refrigerant is divided at the third branch-off point of the third flow path into a first partial mass flow through the first refrigerant-to-air heat exchanger as well as the first flow path and a second partial mass flow through the third flow path as well as the second flow path with the heat exchanger.

12. The method according to claim 10, wherein, during operation of the thermal system in the post-heating mode, the refrigerant is directed through a fully opened first flow passage of the first flow control device and the main flow path of the first flow path with the second refrigerant-to-air heat exchanger to the compressor, wherein a second flow passage of the first flow control device and the bypass flow path of the first flow path are closed and the refrigerant is decompressed from the medium-pressure level to the low-pressure level when passing through the first flow control device and is evaporated with absorption of heat when passing through the heat exchanger operated as the first evaporator.

13. The method according to claim 10, wherein, during operation of the thermal system in the heat pump mode, a mass flow of the refrigerant is directed through a fully opened second flow passage of the first flow control device and the bypass flow path of the first flow path past the second refrigerant-to-air heat exchanger to the compressor, wherein a first flow passage of the first flow control device and the main flow path of the first flow path are closed.

14. A use of the thermal system according to claim 1 as an air-conditioning system of the motor vehicle for conditioning the supply air for the passenger compartment as well as for conditioning components of the power train and electronic components.

* * * * *